(12) United States Patent
Ebihara et al.

(10) Patent No.: US 10,764,509 B2
(45) Date of Patent: Sep. 1, 2020

(54) IMAGE PROCESSING DEVICE, IMAGE PROCESSING METHOD, AND PROGRAM (71) Applicant: Sony Corporation, Tokyo (JP)

(72) Inventors: Masakazu Ebihara, Tokyo (JP); Daisuke Tahara, Tokyo (JP); Takashi Kohashi, Tokyo (JP); Atsushi Kimura, Tokyo (JP); Kazuhiro Shimauchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/241,566

(22) Filed: Jan. 7, 2019

(65) Prior Publication Data
US 2019/0158763 A1  May 23, 2019

Related U.S. Application Data (63) Continuation of application No. 15/301,089, filed as application No. PCT/JP2015/058139 on Mar. 18, 2015, now Pat. No. 10,218,918.

(30) Foreign Application Priority Data

May 19, 2014 (JP) .................................. 2014-103525

(51) Int. Cl.
H04N 5/262 (2006.01)
G06T 7/246 (2017.01)
G06T 1/00 (2006.01)
H04N 1/409 (2006.01)
H04N 1/60 (2006.01)
H04N 5/232 (2006.01)

(52) U.S. Cl.
CPC ............. H04N 5/2621 (2013.01); G06T 1/00 (2013.01); G06T 7/246 (2017.01); H04N 1/409 (2013.01); H04N 1/6097 (2013.01); H04N 5/23254 (2013.01); H04N 5/23296 (2013.01); H04N 5/23219 (2013.01)

(58) Field of Classification Search
CPC ............. H04N 5/2621; H04N 1/6097; H04N 5/23296; H04N 5/23254; H04N 1/409; H04N 5/23219; G06T 7/246; G06T 1/00
See application file for complete search history.

(56) References Cited

U.S. PATENT DOCUMENTS

2008/0253608 A1  10/2008  Long et al.
2012/0133769 A1 *  5/2012  Nagamine ................. B60R 1/00
                                                          348/148

FOREIGN PATENT DOCUMENTS

| JP | 2010-093741 A | 4/2010 |
| JP | 2010-146264 A | 7/2010 |
| JP | 2012-230549 A | 11/2012 |
| JP | 2013-073504 A | 4/2013 |

* cited by examiner

Primary Examiner — Yogesh K Aggarwal
(74) Attorney, Agent, or Firm — Michael Best & Friedrich LLP (57) ABSTRACT

[Object] To select an effect process appropriately according to a feature of an image.
[Solution] Provided is an image processing device including a flow vector detection unit configured to detect flow vectors of pixels in an input image, and an effect selection unit configured to select a process of effect to the input image, on the basis of a pattern of the flow vectors.

27 Claims, 8 Drawing Sheets

IMAGE PROCESSING DEVICE, IMAGE PROCESSING METHOD, AND PROGRAM

CROSS REFERENCES TO RELATED APPLICATIONS

The present Application is a Continuation Application of U.S. patent application Ser. No. 15/301,089 filed Sep. 30, 2016, which is a 371 National Stage Entry of International Application No.: PCT/JP2015/058139, filed on Mar. 18, 2015, which in turn claims priority from Japanese Application No. 2014-103525, filed on May 19, 2014, the entire contents of which are incorporated herein by reference.

TECHNICAL FIELD

The present disclosure relates to an image processing device, an image processing method, and a program.

BACKGROUND ART

Adding effect to an image such as a photograph taken by a user is generally performed already. For example, Patent Literature 1 describes an image processing device that includes a detection means that detects a degree of blurring of an input image, a selection means that selects on the basis of the degree of blurring, one of a plurality of image processes that process an input image by reducing an amount of information included in the input image, and an image processing means that performs the selected image process to the input image. According to such a technology, the image process performed to the input image is automatically selected, and thus the image can be displayed in a simple and effective manner.

CITATION LIST

Patent Literature

Patent Literature 1: JP 2010-146264A

SUMMARY OF INVENTION

Technical Problem

However, in recent years, further spread and performance improvement of devices that have an image capturing function have enabled a user to capture wide variety of high quality images in various situations. Hence, not only effects for eliminating monotony of a slide show of images and reducing ungainliness of an image that is blurred by unstable hand motion or the like, which are described in the above Patent Literature 1, but also an appropriate effect according to a feature of each image is required to be selected.

Thus, the present disclosure proposes a new and improved image processing device, an image processing method, and a program which can select an effect process appropriately according to a feature of an image.

Solution to Problem

According to the present disclosure, there is provided an image processing device including a flow vector detection unit configured to detect flow vectors of pixels in an input image, and an effect selection unit configured to select a process of effect to the input image, on the basis of a pattern of the flow vectors.

According to the present disclosure, there is provided an image processing method including detecting, by a processing circuit of an image processing device, flow vectors of pixels in an input image, and selecting, by the processing circuit of the image processing device, a process of effect to the input image, on the basis of a pattern of the flow vectors.

According to the present disclosure, there is provided a program for causing a processing circuit of an image processing device to implement a function for detecting flow vectors of pixels in an input image, and a function for selecting a process of effect to the input image, on the basis of a pattern of the flow vectors.

Advantageous Effects of Invention

According to the present disclosure, the effect process can be selected appropriately in accordance with the feature of the image, as described above.

Note that the effects described above are not necessarily limitative. With or in the place of the above effects, there may be achieved any one of the effects described in this specification or other effects that may be grasped from this specification.

DESCRIPTION OF EMBODIMENT(S)

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be made in the following order.
1. Exemplary System Configuration
2. Exemplary Function and Configuration
3. Exemplary Configuration of Effect Setting Unit 4. Example of Process Flow
4-1. Zoom Effect Selection Process
4-2. Art Effect Selection Process
5. Hardware Configuration
6. Supplement (1. Exemplary System Configuration)

Figure 1:
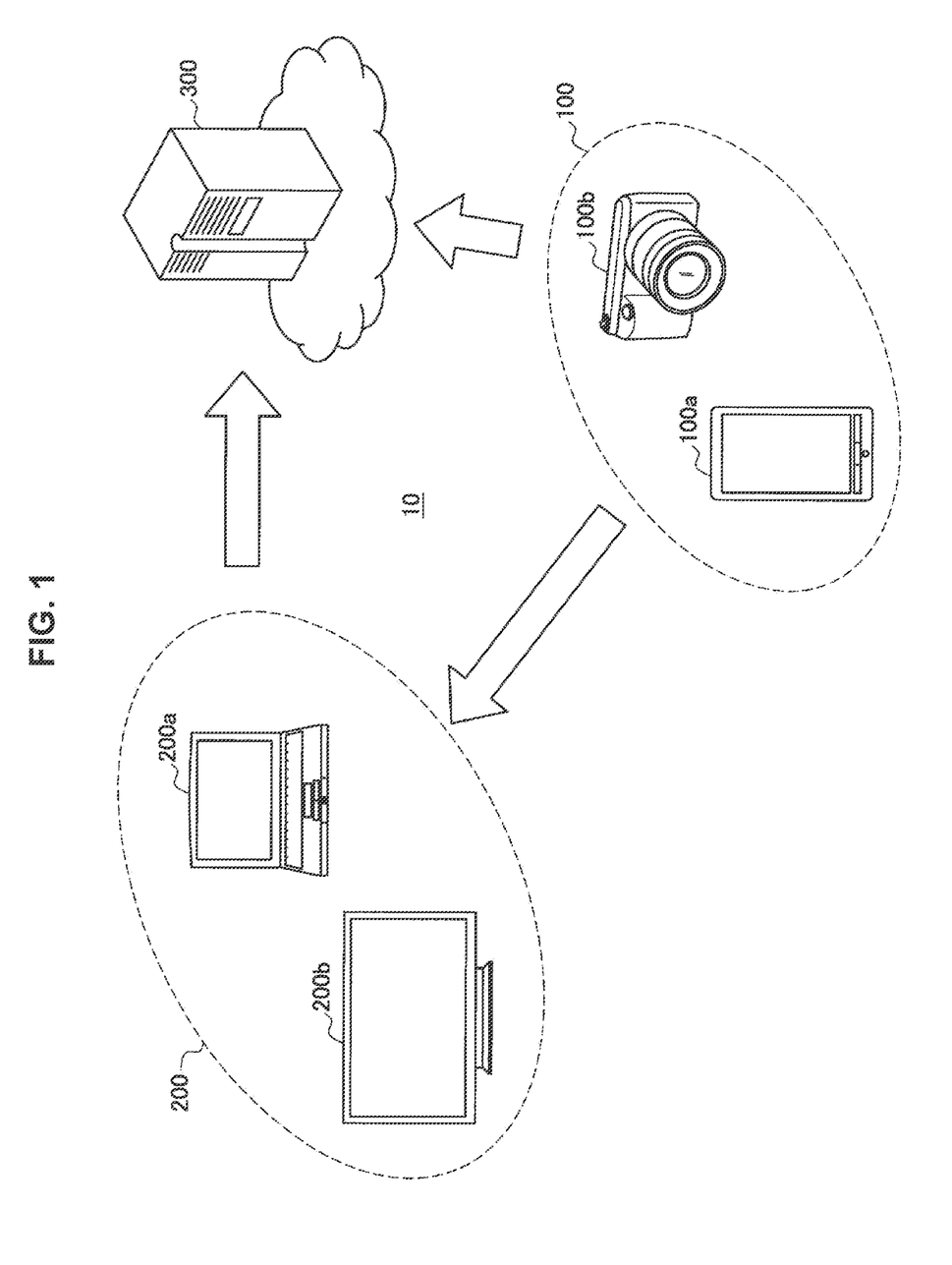
FIG. 1 is a diagram illustrating a schematic exemplary configuration of a system according to an embodiment of the present disclosure.

FIG. 1 is a diagram illustrating a schematic exemplary configuration of a system according to an embodiment of the present disclosure. Referring to FIG. 1, a system 10 can include an imaging device 100, a terminal device 200, and/or a server 300. In the present embodiment, presence or absence of an effect applied to an input image or a type of the effect is selected on the basis of a result of image analysis to the input image (hereinafter, these processes can be collectively referred to as image analysis process).

For example, the input image can be an image captured by the imaging device 100. In this case, the system 10 includes the imaging device 100 at least. The image analysis process may be executed by the imaging device 100. In this case, the system 10 may include only the imaging device 100. Alternatively, the image analysis process may be executed by the terminal device 200 that receives data of an image by wired or wireless communication from the imaging device 100. In this case, the system 10 includes the imaging device 100 and the terminal device 200. Also, the image analysis process may be executed by the server 300 to which the data of the image is forwarded by the wired or wireless communication from the terminal device 200. In this case, the system 10 includes the imaging device 100, the terminal device 200, and the server 300. When the imaging device 100 is communicable with the server 300 directly, the system 10 may include only the imaging device 100 and the server 300.

Note that, even when the image analysis process is executed by the imaging device 100 for example, the selection result of the effect and the input image to which the selected effect is applied may be transmitted to the terminal device 200 or the server 300 from the imaging device 100. In this case, the system 10 can further include the terminal device 200 and/or the server 300. In the same way, even when the image analysis process is executed by the terminal device 200, the selection result of the effect and the input image to which the selected effect is applied may be uploaded to the server 300 from the terminal device 200. In this case, the system 10 can further include the server 300. Also, the result of the image analysis in the server 300 can be fed back to the terminal device 200 and/or the imaging device 100. In the same way, the result of the image analysis in the terminal device 200 can be fed back to the imaging device 100.

Also, for example, the input image may be an image that already exists as data inside the device or in a storage on a network. In this case, the system 10 does not necessarily include the imaging device 100. The image analysis process may be executed by the terminal device 200. In this case, the system 10 may include only the terminal device 200. Alternatively, the image analysis process may be executed by the server 300. In this case, the system 10 may include only the server 300, and may further include the terminal device 200 that acquires the input image and forwards the acquired input image to the server 300. In the same way as the above example, even when the image analysis process is executed by the terminal device 200, the selection result of the effect and the input image to which the selected effect is applied may be uploaded to the server 300 from the terminal device 200. In this case, the system 10 can further include the server 300. Also, the result of the image analysis in the server 300 may be fed back to the terminal device 200. In this case, the system 10 can further include the terminal device 200.

In the following, a configuration of a case in which the system 10 includes each of the imaging device 100, the terminal device 200, and the server 300 will be further described. Note that a hardware configuration of the image processing device described later can be employed for example, as a hardware configuration of each device.

The imaging device 100 is a device that includes an image capturing function. FIG. 1 illustrates a smartphone 100a and a digital camera 100b as examples of the imaging device 100, but the imaging device 100 can include any device that has the image capturing function, such as a tablet, a game machine, and a wearable device, as well. The imaging device 100 includes an image sensor, an optical system and a drive system that relate to the image sensor, and an image processing circuit. The image processing circuit may execute only basic image processing for generating the image data, and may be capable of executing the above described image analysis process. Also, the imaging device 100 may further include a communication device for transmitting the image data or the like to and receiving the image data or the like from the terminal device 200 or the server 300, an output device such as a display and a speaker for outputting information generated internally or information received from the terminal device 200 or the server 300, an input device such as a button and a touch panel for accepting user operation, etc.

The terminal device 200 is the device that includes the image processing function. FIG. 1 illustrates a personal computer 200a and a television 200b as examples of the terminal device 200, but the terminal device 200 can include any device that has the image processing function, such as a tablet, a smartphone, a recorder, and a game machine, as well. Even a device that has the image capturing function such as the tablet and the smartphone can function as the terminal device 200 by receiving an image captured by another device, for example. The terminal device 200 can include a processing circuit, a communication device, and an input-output device. For example, the terminal device 200 may execute the image analysis process by the processing circuit, with regard to the input image that is received from the imaging device 100 by using the communication device, or the input image that is acquired from inside the device or the storage on the network, and output the processing result via the display or the like included in the input-output device. Also, the terminal device 200 may transmit the processing result to the imaging device 100 or the server 300 by using the communication device.

The server 300 is configured with one or a plurality of image processing devices on the network. The image processing device for configuring the server 300 can include a processing circuit and a communication device. For example, the server 300 may execute the image analysis process by the processing circuit, with regard to the input image that is received from the terminal device 200 or the imaging device 100 by using the communication device, or the input image that is acquired from inside the device or the storage on the network, and transmit the processing result to the terminal device 200 or the imaging device 100 by using the communication device.

(2. Exemplary Function and Configuration)

Figure 2:
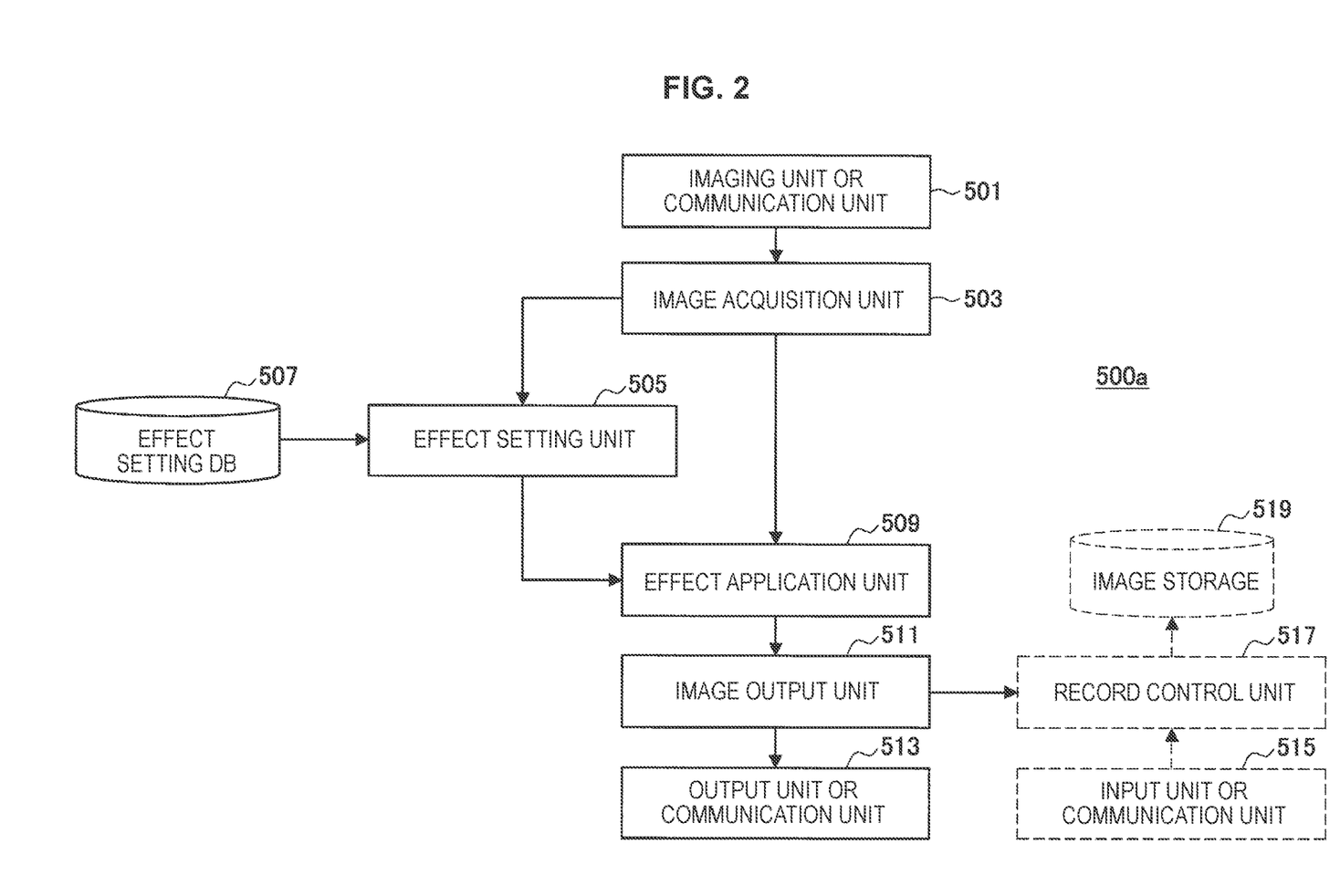
FIG. 2 is a block diagram illustrating a first exemplary function and configuration of a system according to an embodiment of the present disclosure.

FIG. 2 is a block diagram illustrating a first exemplary function and configuration of a system according to an embodiment of the present disclosure. Referring to FIG. 2, the function and configuration 500a includes an imaging unit or a communication unit 501, an image acquisition unit 503, an effect setting unit 505, an effect setting DB 507, an effect application unit 509, an image output unit 511, an output unit or a communication unit 513, an input unit or a communication unit 515, a record control unit 517, and an image storage 519. The function and configuration 500a is configured with any one of the imaging device 100, the terminal device 200, and the server 300 included in the above system 10. Alternatively, a plurality of devices included in the system 10 may cooperate to configure the function and configuration 500a.

In the illustrated first exemplary function and configuration, the input image to which the effect is applied on the basis of the result of the image analysis to the input image, or the input image to which the effect is not applied, is presented to the user. Here, the image may be presented as a preview for record, or may also be presented to be browsed simply. When the image is presented as the preview, the input image to which the effect is applied, or the input image to which the effect is not applied, can be stored in the storage in accordance with operation of a user that refers to the image. In the following, each component will be described.

The imaging unit or the communication unit 501 supplies data of the input image to the image acquisition unit 503. In the system 10, the imaging unit or the communication unit 501 is configured with an image sensor that generates image data at the imaging device 100 for example (imaging unit). Alternatively, the imaging unit or the communication unit 501 is configured with a communication device that receives the image data from the imaging device 100 or the storage on the network at the terminal device 200 or the server 300 (communication unit).

The image acquisition unit 503 is a software interface that acquires the data of the input image from the imaging unit or the communication unit 501. In the system 10, the image acquisition unit 503 is configured with a processing circuit, such as a central processing unit (CPU), included in the imaging device 100, the terminal device 200, or the server 300. The image acquisition unit 503 supplies the input image for the purpose of the image analysis in the effect setting unit 505. Also, the image acquisition unit 503 supplies the input image to the effect application unit 509 (or the image output unit 511), after applying the effect according to the result of the image analysis in the effect setting unit 505, or to output as it is.

The effect setting unit 505 executes the image analysis for selecting presence or absence of the effect applied to the input image acquired by the image acquisition unit 503 or the type of the effect. In the system 10, the effect setting unit 505 is configured with a processing circuit, such as a CPU, included in the imaging device 100, the terminal device 200, or the server 300. The effect setting unit 505 detects flow vectors of pixels in the input image for example, and selects the presence or absence of the effect applied to the input image or the type of the effect on the basis of the pattern of the flow vectors. The effect setting unit 505 may acquire the information relevant to an applicable effect, with reference to the effect setting DB 507. Note that the detailed configuration of the effect setting unit 505 will be described later.

The effect application unit 509 applies the effect to the input image supplied from the image acquisition unit 503, in accordance with the result of the image analysis in the effect setting unit 505. When not applying the effect to the input image is selected by the effect setting unit 505, the process by the effect application unit 509 is skipped, and the image output unit 511 can output the input image as it is. The effect setting unit 505 is configured with a processing circuit, such as a CPU, included in the imaging device 100, the terminal device 200, or the server 300.

The image output unit 511 is a software interface that supplies to the output unit or the communication unit 513 the data of the input image to which the effect is applied, or the input image to which the effect is not applied, in the effect application unit 509. In the system 10, the image output unit 511 is configured with a processing circuit, such as a CPU, included in the imaging device 100, the terminal device 200, or the server 300. Also, the image output unit 511 supplies to the record control unit 517 the data of the input image to which the effect is applied, or the input image to which the effect is not applied, in accordance with the user operation acquired via the input unit or the communication unit 515.

The output unit or the communication unit 513 outputs the data of the input image supplied from the image output unit 511. In the system 10, the output unit or the communication unit 513 is configured with an output device, such as a display, included in the imaging device 100 or the terminal device 200 for example (output unit). Alternatively, the output unit or the communication unit 513 is configured with a communication device for the terminal device 200 transmitting the analysis result to the imaging device 100, or a communication device for the server 300 transmitting the analysis result to the terminal device 200 or the imaging device 100 (communication unit). In this case, the analysis result is output by the device that differs from the device that executes the image analysis process.

Note that the below input unit or the communication unit 515, the record control unit 517, and the image storage 519 are provided when the image output by the output unit or the communication unit 513 is presented to the user as a preview for record. When the image is just presented to be browsed, the function and configuration 500a is needless to include the input unit or the communication unit 515, the record control unit 517, and the image storage 519.

The input unit or the communication unit 515 acquires the operation input by the user that refers to the input image output as the preview by the output unit or the communication unit 513. In the system 10, the input unit or the communication unit 515 is configured with an input device, such as a button and a touch panel, included in the imaging device 100 or the terminal device 200 for example (input unit). Alternatively, the input unit or the communication unit 515 is configured with a receiver device for the terminal device 200 receiving the data from the imaging device 100, or a communication device for the server 300 receiving the data from the terminal device 200 or the imaging device 100 (communication unit). In this case, the user operation is accepted at a device that differs from the device that executes the image analysis process or the image saving process.

The record control unit 517 stores, in the image storage 519, the data of the input image to which the effect is applied, or the input image to which the effect is not applied, in accordance with the user operation acquired by the input unit or the communication unit 515. The data of the input image is acquired from the image output unit 511. In the system 10, the record control unit 517 is configured with a processing circuit, such as a CPU, included in the imaging device 100, the terminal device 200, or the server 300.

Note that, although not illustrated in the drawings, the function and configuration 500a may further include components for changing the type of the effect that is applied to the input image, applying a new effect to the input image, and quitting the application of the effect to the input image, in accordance with the user operation acquired by the input unit or the communication unit 515. A publicly known technology can be applied to these components, and thus their detailed description will be omitted.

Figure 3:
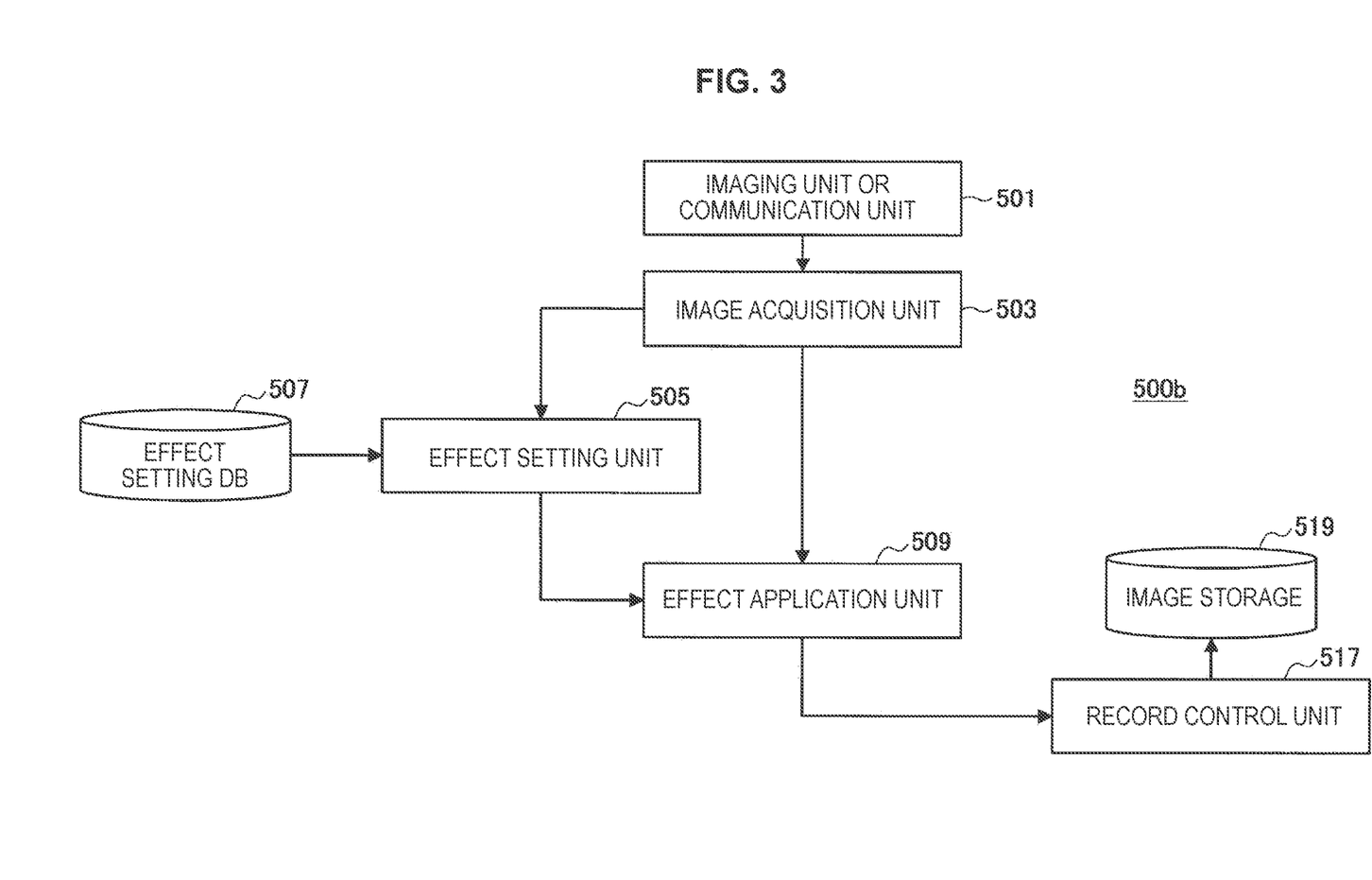
FIG. 3 is a block diagram illustrating a second exemplary function and configuration of a system according to an embodiment of the present disclosure.

FIG. 3 is a block diagram illustrating a second exemplary function and configuration of a system according to an embodiment of the present disclosure. Referring to FIG. 3, the function and configuration 500b include an imaging unit or a communication unit 501, an image acquisition unit 503, an effect setting unit 505, an effect setting DB 507, an effect application unit 509, a record control unit 517, and an image storage 519. The function and configuration 500b is configured with one of the imaging device 100, the terminal device 200, or the server 300 included in the above system 10. Alternatively, a plurality of devices included in the system 10 may cooperate to configure the function and configuration 500b.

In the illustrated second exemplary function and configuration, the input image to which the effect is applied on the basis of the result of the image analysis to the input image, or the input image to which the effect is not applied, is stored in the storage automatically. Thus, in the example illustrated in FIG. 3, the data of the input image to which the effect is applied in the effect application unit 509, or the input image to which the effect is not applied, is supplied to the record control unit 517 as it is. Also, the record control unit 517 stores the supplied image in the image storage 519 automatically. Note that other components are the same as the above first exemplary function and configuration, and thus the duplicate description will be omitted.

In the above exemplary function and configuration of the present embodiment, the process for selecting the presence or absence of the effect applied to the input image or the type of the effect is executed on the basis of the result of the image analysis to the input image. In these examples, the input image to which the effect is applied may be stored in the storage on the basis of the result of the process, and the image to which the effect is applied may be displayed for preview or browse only. That is, in the present embodiment, the process for selecting by the presence or absence of the effect applied to the input image or the type of the effect is executed, but intended use of the processing result is not specified.

(3. Exemplary Configuration of Effect Setting Unit)

Figure 4:
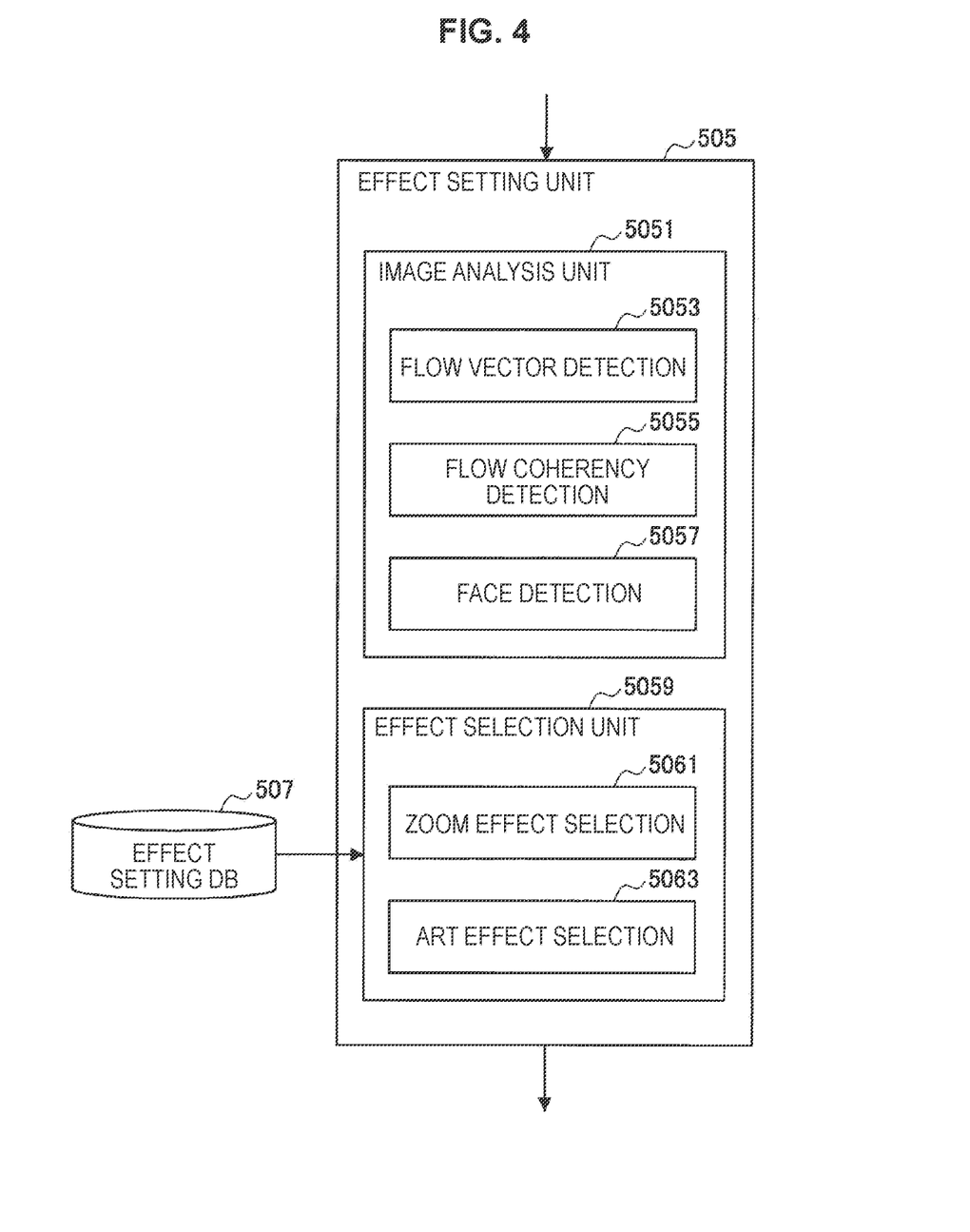
FIG. 4 is a block diagram illustrating an exemplary configuration of an effect setting unit in an embodiment of the present disclosure.

FIG. 4 is a block diagram illustrating an exemplary configuration of an effect setting unit in an embodiment of the present disclosure. Referring to FIG. 4, the effect setting unit 505 includes an image analysis unit 5051 and an effect selection unit 5059. The effect selection unit 5059 includes a zoom effect selection unit 5061 and an art effect selection unit 5063. Note that, as described above, in the system 10, the effect setting unit 505 is configured with a processing circuit, such as a CPU, included in the imaging device 100, the terminal device 200, or the server 300. In the following, each component will be described.

The image analysis unit 5051 includes a flow vector detection unit 5053, a flow coherency detection unit 5055, and a face detection unit 5057, and executes the analysis of the input image.

The flow vector detection unit 5053 detects the flow vectors of the pixels in the input image. A flow vector is a vector indicating direction components of each pixel. More specifically, for example, the flow vector detection unit 5053 may calculate a brightness gradient in the input image by utilizing a Sobel filter and detect the flow vectors on the basis of the brightness gradient. This detection method of flow vectors is described in JP 2012-230549A, for example. Alternatively, the flow vector detection unit 5053 may detect the flow vectors by using "Smoothed Structure Tensor" described in Jan Eric Kyprianidis, Henry Kang, "Image and Video Abstraction by Cocherence-Enhancing Filtering", EUROGRAPHICS 2011, Volume 30 (2011), Number 2. In addition, the flow vector detection unit 5053 can detect the flow vectors by utilizing various publicly known technologies.

The flow coherency detection unit 5055 detects coherency of the flow vectors detected by the flow vector detection unit 5053. The coherency is an index indicating uniformity of the flow vectors, and is calculated on the basis of the directions and/or the sizes of the flow vectors. For example, when a proportion that the directions of the flow vectors are identical between adjacent pixels is high, it is determined that the coherency is intense. Conversely, when a proportion that the directions of the flow vectors are not identical between adjacent pixels is high, it is determined that the coherency is weak. Note that the detection method of the flow coherency is described in JP 2013-246460A, for example. In addition, the flow coherency detection unit 5055 can detect the flow coherency by utilizing various publicly known technologies.

The face detection unit 5057 detects a face included in the input image. The face detection unit 5057 calculates a face region included in the input image by using various publicly known algorithms, such as wavelet conversion and Haar feature detection for example. Note that the determination based on the face region in the later described effect selection unit 5059 is additional, and thus the image analysis unit 5051 is needless to include the face detection unit 5057 necessarily. Also, the effect selection unit 5059 may be enabled to perform the determination based on the face region which is included in the input image, on the basis of metadata or the like, even without the face detection unit 5057. Alternatively, the image analysis unit 5051 may include the face detection unit 5057, regardless of the determination in the effect selection unit 5059.

The effect selection unit 5059 includes the zoom effect selection unit 5061 and the art effect selection unit 5063, and selects a process of the effect to the input image, on the basis of the result of the analysis in the image analysis unit 5051, more specifically the pattern of the flow vectors of the pixels in the input image. More specifically, the effect selection unit 5059 may select presence or absence of the effect to the input image, as the process of the effect. Also, the effect selection unit 5059 may select the type of the effect, as the process of the effect. The pattern of the flow vectors may be presence or absence of a vanishing point, for example. Also, the pattern of the flow vectors may be identified by the coherency of the flow vectors or the like. The effect selection unit 5059 may select the type of the effect to the input image, on the basis of the coherency of the flow vectors, as the process of the effect. Also, the effect selection unit 5059 may select the presence or absence of the effect to the input image, on the basis of the coherency of the flow vectors, as the process of the effect.

The zoom effect selection unit 5061 selects whether or not to apply the zoom effect to the input image, or the type of the zoom effect applied to the input image. That is, the zoom effect selection unit 5061 included in the effect selection unit 5059 may select whether or not to apply the zoom effect to the input image, on the basis of the presence or absence of the vanishing point, as the process of the effect. Here, in the present specification, the zoom effect means the effect that imaginarily changes a view angle with reference to a certain point in the image. The zoom effect can include a first zoom effect that simply zooms in to the certain point in the image, and a second zoom effect that rebuilds a space model with reference to the certain point in the image and imaginarily moves the viewpoint so that the reference point becomes the deepest portion and thereafter zooms in, for example. In the second zoom effect, video effect that gives a sense of immersion such as imaginary walk-through is obtained, and therefore the second zoom effect is also referred to as "walk-through" simply in the following description. The edge of the image, particularly its periphery portion, blurs due to the rebuilding of the space model in the walk-through, whereas the edge is preserved without blurring in the first zoom effect, and therefore the first zoom effect is also referred to as "edge preservation zoom" in the following description. The zoom effect selection unit 5061 selects to apply the walk-through to the input image, to apply the edge preservation zoom, or not to apply both the zoom effects, for example.

The art effect selection unit 5063 selects whether or not to apply the art effect to the input image, or the type of the art effect applied to the input image. Here, in the present specification, the art effect includes a filter of watercolor painting style, oil painting style, illustration style, or pointillism style, for example. For example, in the filter of the watercolor painting style, an image of a style such as the watercolor painting is obtained, by preserving the edge and performing smoothing. Also, in the filter of the oil painting style, an image of a style such as the oil painting is obtained, by drawing a pattern that is similar to strokes of brush. In the filter of the illustration style, an image of a style such as the illustration is obtained, by drawing smooth lines in accordance with the edge. In the filter of the pointillism style, an image of a style such as the pointillism is obtained, by drawing a pattern of short ellipse shapes. Note that the art effect can utilize publicly known technologies described in JP H8-44867A, JP 2011-160306A, JP 2011-166217A, A. Hertzmann, "Painterly Rendering with Curved Brush Strokes of Multiple Sizes," Proc. Sgigraph 98, ACM Press, 1998, pp. 453-460, for example. The art effect selection unit 5063 selects to apply one of the above art effects to the input image, or not to apply the art effects, for example.

As described above, the zoom effect selection unit 5061 and the art effect selection unit 5063 select the presence or absence of the effect applied to the input image or the type of the effect, on the basis of the pattern of the flow vectors of the pixels in the input image, for example. Also, the zoom effect selection unit 5061 and the art effect selection unit 5063 may additionally select the presence or absence of the effect applied to the input image or the type of the effect, on the basis of the presence or absence of the face detection in the input image or the size of the face region, or the state of the edge and the color in the input image. An example of the process of this selection will be further described with reference to flowcharts below.

(4. Example of Process Flow)
(4-1. Zoom Effect Selection Process)

Figure 5:
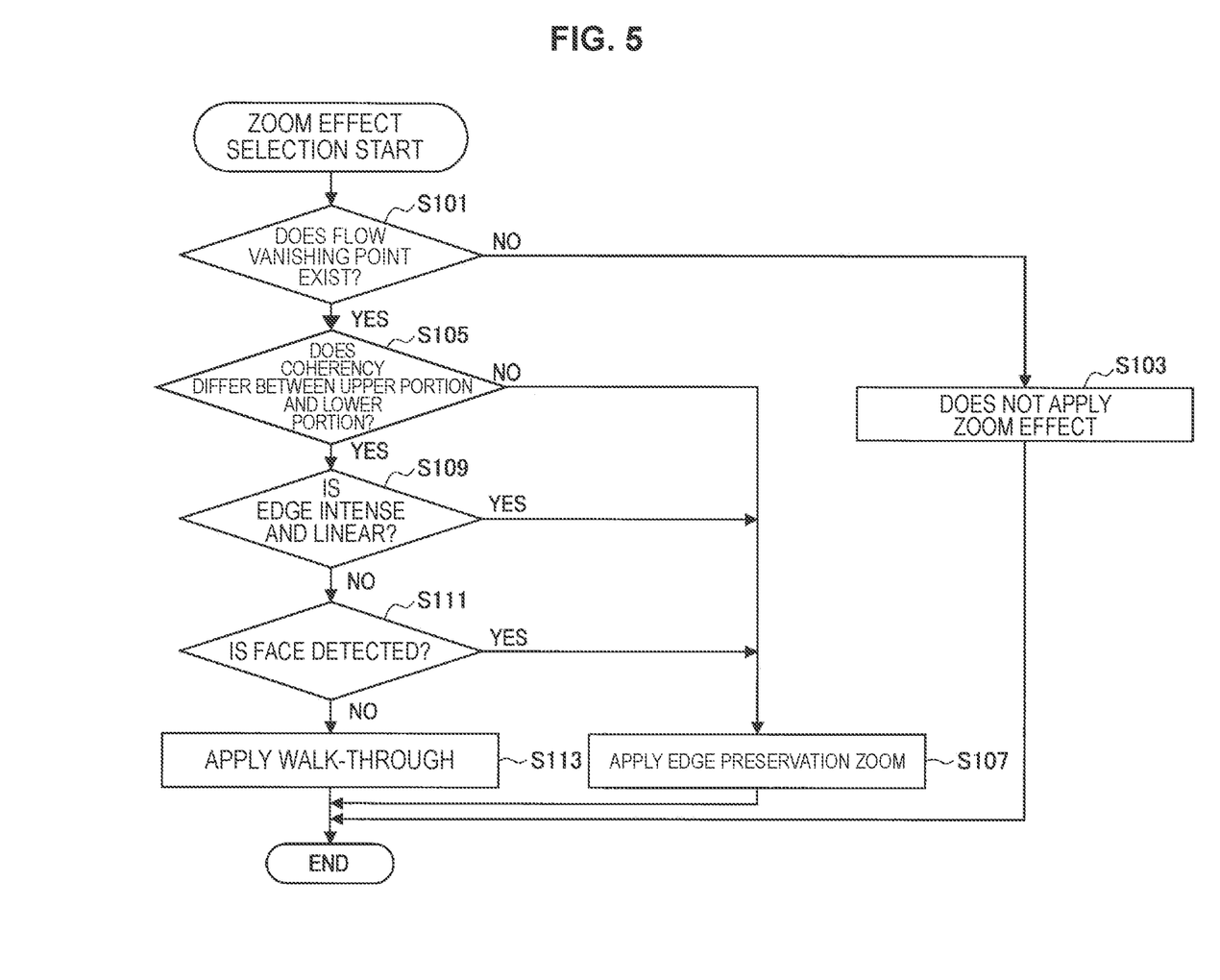
FIG. 5 is a flowchart illustrating an example of a zoom effect selection process in an embodiment of the present disclosure.

FIG. 5 is a flowchart illustrating an example of the zoom effect selection process in an embodiment of the present disclosure. Referring to FIG. 5, first, the zoom effect selection unit 5061 determines whether or not a flow vanishing point exists in the input image (S101). The flow vanishing point is the vanishing point formed by the flow vectors detected by the flow vector detection unit 5053. When the flow vanishing point exists, the vectors in the radial direction from a center at a certain point in the image becomes dominant in the flow vectors of the input image. Note that the detection of the vanishing point can utilize a publicly known technology described in U.S. Patent Application Publication No. 2013/0094764, for example.

If it is determined that the flow vanishing point does not exist in the input image in the determination of the above S101 (NO), the zoom effect selection unit 5061 selects not to apply the zoom effect to the input image (S103), and ends the process. The zoom effect is effective when applied with reference to the vanishing point, in the image that includes scenery that has depth, for example. Conversely, in the case of an image that does not have the depth, or when the vanishing point is not included in the image even with the depth, it is difficult to effectively use the zoom effect. Thus, in the illustrated example, the zoom effect selection unit 5061 selects not to apply the zoom effect when it is determined that the flow vanishing point does not exist in the input image.

On the other hand, if it is determined that the flow vanishing point exists in the input image in the determination of S101 (YES), the zoom effect selection unit 5061 selects to apply the zoom effect to the input image, and executes the processes of S105 to S113 for selecting the type of the zoom effect. Note that, in the illustrated example, two types of zoom effects (the walk-through and the edge preservation zoom) are defined in the effect setting DB 507, and thus the above process is executed. In another example, when only one type of zoom effect (for example, only the edge preservation zoom) is defined, it may be decided to apply the zoom effect, at a time point when it is determined that the flow vanishing point exists in the input image in the determination of S101. In this case, the determination that uses the coherency of the flow vectors is not performed, and thus the flow coherency detection unit 5055 is needless to be provided necessarily.

In the illustrated example, if it is determined that the flow vanishing point exists in the input image in the determination of S101, the zoom effect selection unit 5061 further determines whether or not the coherency of the flow vectors in the input image differs between the upper portion and the lower portion (S105). More specifically, the zoom effect selection unit 5061 determines whether or not a tendency that the coherency of the flow vectors is weak in the region of the upper portion of the input image and is intense in the region of the lower portion is observed. This tendency is an example of the tendency according to the region of the input image, of the coherency. The image from which this tendency is observed can be an image that is captured outdoor. For example, when scenery of sky and ground appears in the image captured outdoor, the flow vectors are directed in various directions in the region of the sky, and thus the coherency becomes weaker. On the other hand, some sort of subject, such as a building and a road, exists in the region of the scenery of the ground, and thus the coherency becomes intenser as compared with the region of the sky. The determination of S105 determines whether or not the input image is an image that is captured outdoor, by utilizing this tendency.

Note that, in another example, instead of the determination of the above S105, it may be determined that the input image is an image that is captured outdoor, if a color histogram of the input image is acquired, and a tendency that the upper portion of the input image is brighter than the lower portion is observed, for example.

In the determination of the above S105, if it is not determined that the coherency of the flow vectors in the input image differs between the upper portion and the lower portion (NO), the zoom effect selection unit 5061 selects to apply the edge preservation zoom to the input image (S107). As described above, in the determination of S105, it can be determined whether or not the input image is an image that is captured outdoor. Thus, if it is not determined that the coherency of the flow vectors differs between the upper portion and the lower portion, it is estimated that the input image is not an image that is captured outdoor. This image includes an image captured indoor. In the case of the image captured indoor, the subject generally exists to the periphery portion of the image, in many cases. Therefore, when the effect of the walk-through is applied to the image captured indoor for example, it is possible to give sense of strangeness due to a blurred edge of the subject at the periphery portion. Thus, in the illustrated example, when there is a possibility that the input image is an image that is captured indoor, the edge preservation zoom is applied to prevent the sense of strangeness from being given.

On the other hand, if it is determined that the coherency of the flow vectors in the input image differs between the upper portion and the lower portion in the determination of S105 (YES), the zoom effect selection unit 5061 further determines whether or not the input image includes an intense linear edge (S109). Here, if it is determined that the intense linear edge is included (YES), the zoom effect selection unit 5061 selects to apply the edge preservation zoom to the input image (S107). That is, in this case, the zoom effect selection unit 5061 included in the effect selection unit 5059 selects the edge preservation zoom as the zoom effect, when the zoom effect is applied to the input image, and the input image includes the linear edge. When the input image includes the intense linear edge, it is highly possible that an artificial structure, such as a building and a road, is included in the subject of the input image. When the effect of the walk-through is applied to the image that includes this subject, it is possible that the edge of the subject of the artificial structure gives the sense of strangeness due to the blurred periphery portion. Thus, in the illustrated example, when there is a high possibility that the artificial structure is included in the subject of the input image, the edge preservation zoom is applied to prevent the sense of strangeness from being given.

Note that there are sobel filter, Laplacian filter, and the like as the technologies for detecting the edge, edge continuity can be calculated from edge information obtained from the result. At that time, for example, only the edge whose continuity is confirmed is left, in order to calculate the degree of the edge linearity. In an example of a calculation method of the degree of the linearity, an adjacent edge that has continuity is regarded as a straight line edge (A) if the angle of the adjacent edge that has the continuity is continuous within a certain constant width, and is regarded as a non-straight line edge (B) in other cases, in order to be counted. Then, a proportion (A:B) of the straight line edge and the non-straight line edge is confirmed, and if the proportion of the straight line edge (A) is high, the edge is determined as "intense straight line edge". To say specifically, this process is a process that determines as "intense straight line edge" when A/A+B=50% or more (the numerical value of the proportion is an example, and is not limited to 50% but can be set arbitrarily). The determination in this example intends to prevent the straight line of the artificial structure such as the building from getting distorted at the time of the walk-through. A scene including many artificial structures includes comparatively many straight line edges (A), and thus if the proportion of (A) is high, the edge preservation zoom is selected.

If it is determined that an intense linear edge is not included in the input image in the determination of the above S109 (NO), the zoom effect selection unit 5061 further determines whether or not the face detection unit 5057 has detected the face included in the input image (S111). Here, if the face included in the input image is detected (YES), the zoom effect selection unit 5061 selects to apply the edge preservation zoom to the input image (S107). That is, in this case, the zoom effect selection unit 5061 included in the effect selection unit 5059 selects the edge preservation zoom as the zoom effect, when the zoom effect is applied to the input image, and the face is included in the input image. When the effect of the walk-through is applied to the image that includes the face as the subject, it is possible to give a sense of strangeness due to the blurred edge of the face at the periphery portion. Thus, in the illustrated example, the edge preservation zoom is applied when the subject of the input image includes a face, in order to prevent the sense of strangeness from being given.

On the other hand, if the face included in the input image is not detected in the determination of S109 (NO), the zoom effect selection unit 5061 selects to apply the effect of the walk-through to the input image (S113). In the illustrated example, when the input image that includes the flow vanishing point is captured outdoor (YES of S105), and does not include the artificial structure as the subject (NO of S109), and does not include the face (NO of S111), the effect of the walk-through is applied. As a result, in the illustrated example, the effect of the walk-through is applied when the input image is a scenery image that includes an outdoor natural object as a main object (S113), and in other cases the effect of the edge preservation zoom is applied (S107). In the above process, the zoom effect selection unit 5061 included in the effect selection unit 5059 selects the type of the zoom effect, on the basis of the coherency of the flow vectors, when applying the zoom effect to the input image. More specifically, the zoom effect selection unit 5061 selects one of the walk-through and the edge preservation zoom, as the zoom effect, on the basis of the tendency according to the region of the input image, of the coherency of the flow vectors.

By the above selection process of the zoom effect, the zoom effect can be applied selectively to the input image appropriate for the zoom effect (for example, identified by the included flow vanishing point). Also, the edge preservation zoom is applied to the input image in which the edge is positioned at the periphery portion or which is likely to give a sense of strangeness due to the blurred edge, while the effect of the walk-through is applied to the image in which those are not the case, and thereby the sense of strangeness is prevented, while the video effect that has the sense of immersion is obtained as much as possible.

(4-2. Art Effect Selection Process)

Figure 6:
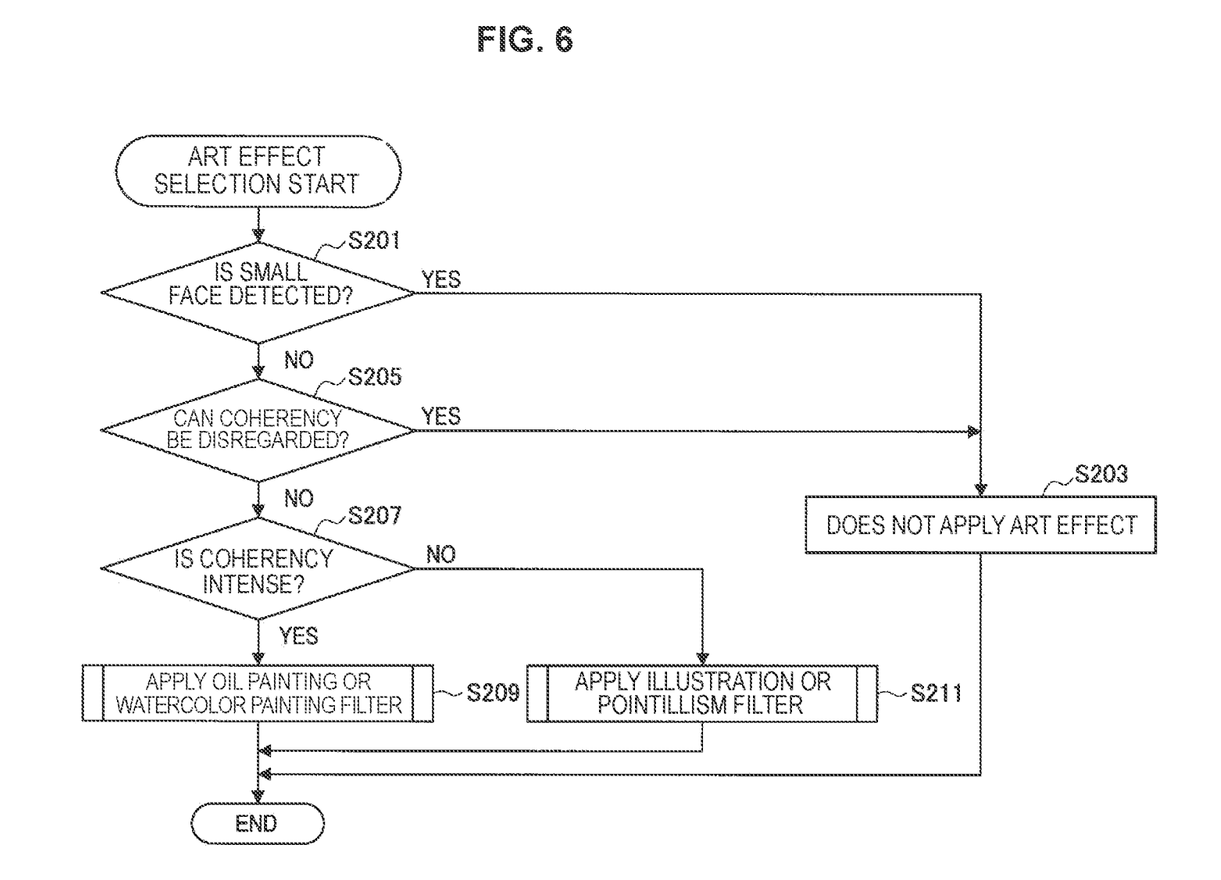
FIG. 6 is a flowchart illustrating an example of an art effect selection process in an embodiment of the present disclosure.

FIG. 6 is a flowchart illustrating an example of the art effect selection process in an embodiment of the present disclosure. Referring to FIG. 6, first, the art effect selection unit 5063 determines whether or not the face detection unit 5057 has detected a small face in the input image (S201). The small face is a face whose size of individual face regions are smaller than a predetermined threshold value, for example. Here, if the small face is detected (YES), the art effect selection unit 5063 selects not to apply the art effect to the input image (S203), and ends the process. In this case, the art effect is not applied to the input image, regardless of the intensity of the coherency of the flow vectors. That is, the effect selection unit 5063 included in the effect selection unit 5059 does not apply the art effect to the input image, regardless of the intensity of the coherency, when the face included in the input image is smaller than a predetermined size. The art effect in the present embodiment can make a part of the edge included in the input image unsharp, and thus it is possible that a small subject is painted over. On the other hand, when the subject is a face particularly, it is highly possible that the face is expected to be visually confirmable in the image after the effect is applied. Thus, in the illustrated example, the art effect selection unit 5063 selects not to apply the art effect when the small face is detected in the input image.

On the other hand, if the fine face is not detected in the input image in the determination of S201 (NO), the art effect selection unit 5063 selects to apply the art effect to the input image. In the illustrated example, the processes of S205 to S211 are further executed subsequently, only the process of S201 may be independently performed as a process for selecting whether or not to apply the art effect.

In the illustrated example, if the fine face is not detected in the input image in the determination of S201, the art effect selection unit 5063 further determines whether or not the coherency of the flow vectors in the input image is weak to an extent that can be disregarded (S205). In the process at and after S205, the art effect selection unit 5063 included in the effect selection unit 5059 selects the type of the art effect as the effect, on the basis of the intensity of the coherency, as the process of the effect. More specifically, here, if it is determined that the coherency is weak to the extent that can be disregarded (YES), the art effect selection unit 5063 selects not to apply the art effect to the input image (S203). That is, in this case, the art effect selection unit 5063 included in the effect selection unit 5059 does not apply the art effect as the effect to the input image, when the intensity of the coherency is smaller than a threshold value. For example, the filter of the oil painting style or the watercolor painting style included in the art effect draws strokes of a brush along the directions of the flow vectors. Also, the filter of the illustration style draws smooth lines along the direction in of the edge. The filter of the pointillism changes the angle of the pattern of the ellipse shapes in accordance with the directions of the flow vectors. Thus, when the coherency is weak, that is, the directions of the flow vectors are not identical overall, the advantages of the above filters are unlikely to appear. Thus, in the illustrated example, the art effect selection unit 5063 selects not to apply the art effect, when it is determined that the coherency of the flow vectors in the input image is weak to the extent that can be disregarded.

Note that the intensity of the coherency is detected by utilizing a technology such as vector coherency detection described in JP 2013-46460A, for example. In this case, vectors (gradients) are calculated as illustrated in FIG. 4 of JP 2013-46460A, and the coherency of neighboring vectors is calculated, for example. Vector coherency illustrated in FIG. 3 of JP 2013-46460A can be calculated, by normalizing the result. Here, for example, when the normalized result is expressed by setting the intensity of the vector coherency between 0 (weak) to 100 (intense), and the regions of low coherency, such as the sky, are aggregated at a zone of 0 to 25 for example, the zone of 0 to 25 may be defined as "zone of weak coherency" (which is not limited to the above example but can be set arbitrarily, because the numerical range can fluctuate by an algorithm for calculating the degree of the normalization and the intensity of the coherency). In this case, a scene in which the coherency whose intensity is included in "zone of weak coherency" is dominant does not obtain the advantage of the art filter, and thus may select not to apply the art filter.

On the other hand, if it is determined that the coherency of the flow vectors in the input image is not weak to the extent that can be disregarded in the determination of S205 (NO), the art effect selection unit 5063 selects to apply the art effect to the input image, and executes the processes of S207 to S211 for selecting the type of the art effect. Note that, in the illustrated example, four types of art effects (the filters of the watercolor painting style, the oil painting style, the illustration style, and the pointillism style) are defined in the effect setting DB 507, and thus an above example is executed. In another example, when only one type of art effect is defined, application of the art effect may be decided, at a time point at which it is determined that the coherency of the flow vectors in the input image is not weak to the extent can be disregarded in the determination of S205. Also, when only a part of the above four types of art effects is defined for example, a part of the process for selecting the type, which is described below, is omitted.

In the illustrated example, if it is determined that the coherency of the flow vectors in the input image is not weak to the extent that can be disregarded in the determination of S205, the art effect selection unit 5063 further determines whether or not the coherency of the flow vectors in the input image is intense exceeding a certain degree (S207). Here, if it is determined that the coherency is intense exceeding the certain degree (YES), the art effect selection unit 5063 decides to apply the effect of the filter of the oil painting style or the watercolor painting style to the input image, and executes the later described oil painting or watercolor painting selection process (S209). Here, the effect of the filter of the oil painting style or the watercolor painting style is the art effect that expresses brushstrokes in the input image. That is, in this case, the art effect selection unit 5063 included in the effect selection unit 5059 applies the art effect that expresses the brushstrokes to the input image, as the art effect, when the coherency exceeds a predetermined intensity.

On the other hand, if it is not determined that the coherency is intense exceeding the certain degree (NO), the art effect selection unit 5063 decides to apply the filter of the illustration style or the pointillism style to the input image, and executes the later described illustration or pointillism selection process (S211). The determination in the above S207 is based on the fact that the filter of the oil painting style or the watercolor painting style is suitable when the coherency of the flow vectors in the image is comparatively intense (because the expression of the strokes of the brush is rich), and that the filter of the illustration style or the pointillism style is suitable when the coherency of the flow vectors in the image is comparatively weak.

Figure 7:
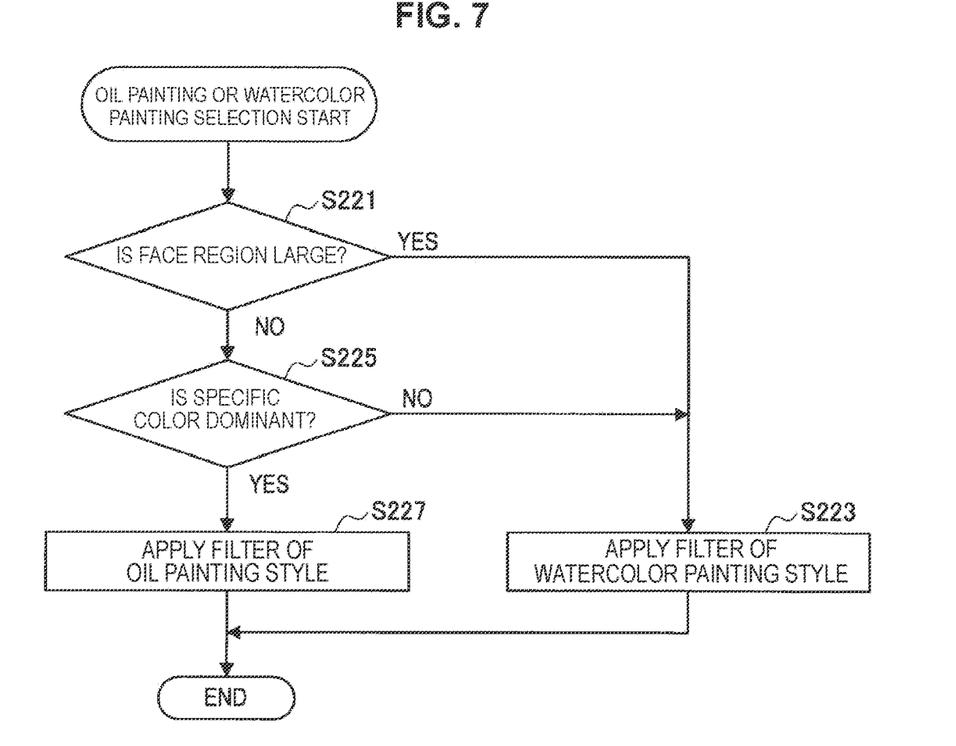
FIG. 7 is a flowchart illustrating an example of an oil painting or watercolor painting selection process in an embodiment of the present disclosure.

FIG. 7 is a flowchart illustrating an example of the oil painting or watercolor painting selection process in an embodiment of the present disclosure. The oil painting or watercolor painting selection process is referred as S209 in the above FIG. 6. Referring to FIG. 7, first, the art effect selection unit 5063 determines whether or not the face region that the face detection unit 5057 has detected in the input image is large exceeding a certain degree (S221). Here, if it is determined that the face region is large exceeding the certain degree (YES), the art effect selection unit 5063 selects to apply the filter of the watercolor painting style to the input image (S223). That is, in this case, the art effect selection unit 5063 included in the effect selection unit 5059 applies the art effect of the watercolor painting style, as the art effect that expresses the brushstrokes, when the face region included in the input image accounts for a predetermined proportion or more of the input image. The filter of the watercolor painting style is more suitable for the expression of the skin of the face and the hair.

On the other hand, in the determination of S221, if it is determined that the face region is not large exceeding the certain degree (NO) the art effect selection unit 5063 further determines whether or not a specific color is dominant in the input image (S225). More specifically, the art effect selection unit 5063 acquires the color histogram of the input image, and determines whether or not a vivid color, such as yellow and red, is dominant. Here, if a specific color is dominant in the input image (YES), the art effect selection unit 5063 selects to apply the filter of the oil painting style to the input image (S227). On the other hand, if a specific color is not dominant in the input image (NO), the art effect selection unit 5063 selects to apply the filter of the watercolor painting style to the input image (S223). That is, in this case, the art effect selection unit 5063 included in the effect selection unit 5059 applies the art effect of the oil painting style, as the art effect that expresses the brushstrokes, when a specific color is dominant in the input image. This is because, while the filter of the oil painting style is effective in the expression of the vivid color, the filter of the watercolor painting style obtains a more appropriate result in many cases with respect to other colors.

Figure 8:
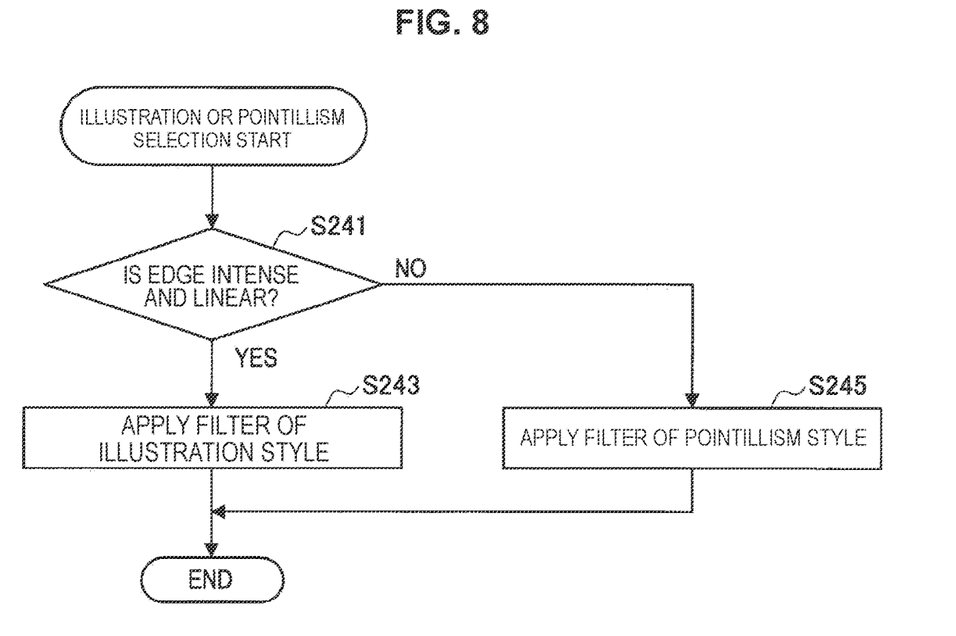
FIG. 8 is a flowchart illustrating an example of an illustration or pointillism selection process in an embodiment of the present disclosure.

FIG. 8 is a flowchart illustrating an example of the illustration or pointillism selection process in an embodiment of the present disclosure. The illustration or pointillism selection process is referred as S211 in the above FIG. 6. Referring to FIG. 8, first, the art effect selection unit 5063 determines whether or not the input image includes an intense linear edge (S241). Here, if it is determined that the intense linear edge is included (YES), the art effect selection unit 5063 selects to apply the filter of the illustration style to the input image (S243). On the other hand, if it is determined that the intense linear edge is not included in the input image (NO), the art effect selection unit 5063 selects to apply the filter of the pointillism style to the input image (S245). That is, in this example, the art effect selection unit 5063 included in the effect selection unit 5059 applies one of the art effect of the illustration style and the art effect of the pointillism style, as the art effect, on the basis of the degree of the linear edge included in the input image, when applying the art effect to the input image.

As described above, in the filter of the illustration style, an image of a style such as illustration is obtained by drawing smooth lines in accordance with the edge. Thus, the filter of the illustration style is effective particularly in the image that includes the intense linear edge. This image can be the image that includes an artificial structure such as a building and a road as the subject, for example. On the other hand, when the edge is weak and is not linear, the image can be a scenery image that includes a natural object as the main object, for example. In this case, the filter of the pointillism style is effective.

The above selection process of the art effect can select appropriately whether or not to apply the art effect to the input image, and when the art effect is applied, what type of art effect to apply, in accordance with the coherency of the flow vectors in the input image, the face detection, the state of the edge, or the like. Thereby, various type of art effects are selectively applied to the input image, and the advantage of the effect can be maximized.

(5. Hardware Configuration)

Figure 9:
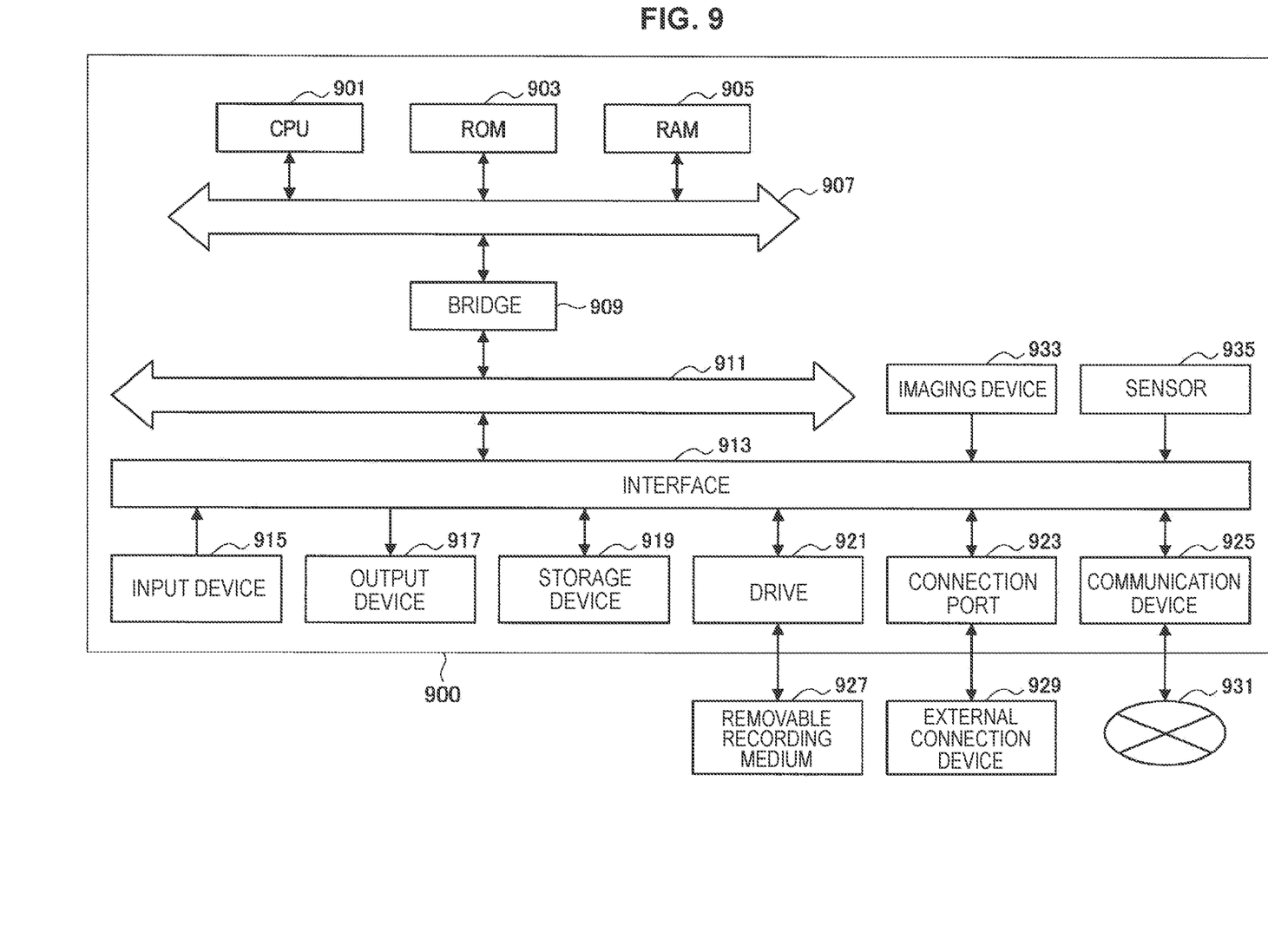
FIG. 9 is a block diagram illustrating an exemplary hardware configuration of the image processing device according to an embodiment of the present disclosure.

Next, with reference to FIG. 9, a hardware configuration of an image processing device according to an embodiment of the present disclosure is described. FIG. 9 is a block diagram illustrating a hardware configuration example of the image processing device according to the embodiment of the present disclosure. An illustrated image processing device 900 may achieve the imaging device, the terminal device and the server in the above described embodiment.

The image processing device 900 includes a central processing unit (CPU) 901, read only memory (ROM) 903, and random access memory (RAM) 905. In addition, the image processing device 900 may include a host bus 907, a bridge 909, an external bus 911, an interface 913, an input device 915, an output device 917, a storage device 919, a drive 921, a connection port 923, and a communication device 925. Moreover, the image processing device 900 may include an imaging device 933 and a sensor 935, as necessary. The image processing device 900 may include a processing circuit such as a digital signal processor (DSP) or an application-specific integrated circuit (ASIC), instead of or in addition to the CPU 901.

The CPU 901 functions as an arithmetic processing device and a control device, and controls the overall operation or a part of the operation of the image processing device 900 according to various programs recorded in the ROM 903, the RAM 905, the storage device 919, or a removable recording medium 927. The ROM 903 stores programs, operation parameters, and the like used by the CPU 901. The RAM 905 transiently stores programs used when the CPU 901 is executed, and parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may be a remote control device that uses, for example, infrared radiation and another type of radio waves. Alternatively, the input device 915 may be an external connection device 929 such as a mobile phone that corresponds to an operation of the image processing device 900. The input device 915 includes an input control circuit that generates input signals on the basis of information which is input by a user to output the generated input signals to the CPU 901. The user inputs various types of data and indicates a processing operation to the image processing device 900 by operating the input device 915.

The output device 917 includes a device that can visually or audibly report acquired information to a user. The output device 917 may be, for example, a display device such as a liquid crystal display (LCD), a plasma display panel (PDP), and an organic electro-luminescence (EL) display, an audio output device such as a speaker and a headphone, and a printer. The output device 917 outputs a result obtained through a process performed by the image processing device 900, in the form of text or video such as an image, or sounds such as voice and audio sounds.

The storage device 919 is a device for data storage that is an example of a storage unit of the image processing device 900. The storage device 919 includes, for example, a magnetic storage device such as a hard disk drive (HDD), a semiconductor storage device, an optical storage device, or a magneto-optical storage device. The storage device 919 stores therein the programs and various data executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the image processing device 900. The drive 921 reads out information recorded on the mounted removable recording medium 927, and outputs the information to the RAM 905. The drive 921 writes the record into the mounted removable recording medium 927.

The connection port 923 is a port used to directly connect devices to the image processing device 900. The connection port 923 may be a Universal Serial Bus (USB) port, an IEEE1394 port, or a Small Computer System Interface (SCSI) port, for example. The connection port 923 may also be an RS-232C port, an optical audio terminal, a High-Definition Multimedia Interface (HDMI (registered trademark)) port, and so on. The connection of the external connection device 929 to the connection port 923 makes it possible to exchange various kinds of data between the image processing device 900 and the external connection device 929.

The communication device 925 is a communication interface including, for example, a communication device for connection to a communication network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transits signals to and receives signals from another communication device by using a predetermined protocol such as TCP/IP. The communication network 931 to which the communication device 925 connects is a network established through wired or wireless connection. The communication network 931 is, for example, the Internet, a home LAN, infrared communication, radio wave communication, or satellite communication.

The imaging device 933 is a device that shoots a real space by using an image sensor such as a charge coupled device (CCD) and a complementary metal oxide semiconductor (CMOS), and various members such as a lens for controlling image formation of a subject image onto the image sensor, and generates the shot image. The imaging device 933 may shoot a still image or a moving image.

The sensor 935 is various sensors such as an acceleration sensor, a gyro sensor, a geomagnetic sensor, an optical sensor, and a sound sensor. The sensor 935 acquires information regarding a state of the image processing device 900 itself such as a posture of a housing of the image processing device 900, and information regarding an environment surrounding the image processing device 900 such as luminous intensity and noise around the image processing device 900. The sensor 935 may include a global positioning system (GPS) sensor that receives GPS signals to measure latitude, longitude, and altitude of the device.

The example of the hardware configuration of the image processing device 900 has been described. Each of the structural elements described above may be configured by using a general purpose component or may be configured by hardware specialized for the function of each of the structural elements. The configuration may be changed as necessary in accordance with the state of the art at the time of working of the present disclosure.

(6. Supplement)

The embodiments of the present disclosure may include, for example, the above-described image processing device (the imaging device, the terminal device, or the server), the system, the image processing method executed by the image processing device or the system, a program for causing the image processing device to exhibit its function, and a non-transitory tangible medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An image processing device including:

a flow vector detection unit configured to detect flow vectors of pixels in an input image; and an effect selection unit configured to select a process of effect to the input image, on the basis of a pattern of the flow vectors.

(2)

The image processing device according to (1), wherein the effect selection unit selects presence or absence of the effect to the input image, as the process of the effect.

(3)

The image processing device according to (1) or (2), wherein the effect selection unit selects a type of the effect, as the process of the effect.

(4)

The image processing device according to any one of (1) to (3), wherein the pattern of the flow vectors is presence or absence of a vanishing point.

(5)

The image processing device according to (4), wherein the effect selection unit selects whether or not to apply zoom effect to the input image, on the basis of the presence or absence of the vanishing point, as the process of the effect.

(6)

The image processing device according to (5), wherein the effect selection unit selects edge preservation zoom as the zoom effect, when the zoom effect is applied to the input image, and when the input image includes a linear edge.

(7)

The image processing device according to (5) or (6), wherein the effect selection unit selects edge preservation zoom, as the zoom effect, when the zoom effect is applied to the input image, and when a face is included in the input image.

(8)

The image processing device according to any one of (1) to (7), wherein the pattern of the flow vectors is identified by coherency of the flow vectors.

(9)

The image processing device according to any one of (1) to (8), wherein the effect selection unit selects a type of the effect to the input image, on the basis of coherency of the flow vectors, as the process of the effect.

(10)

The image processing device according to any one of (1) to (9), wherein
the effect selection unit selects presence or absence of the effect to the input image, on the basis of coherency of the flow vectors, as the process of the effect.

(11)

The image processing device according to (9), wherein
the effect selection unit selects a type of art effect as the effect, on the basis of an intensity of the coherency, as the process of the effect.

(12)

The image processing device according to (10), wherein
the effect selection unit does not apply art effect as the effect to the input image, when an intensity of the coherency is smaller than a threshold value.

(13)

The image processing device according to (11), wherein
the effect selection unit applies art effect that expresses brushstrokes to the input image, as the art effect, when the coherency exceeds a predetermined intensity.

(14)

The image processing device according to (13), wherein
the effect selection unit applies art effect of a watercolor painting style, as the art effect that expresses the brushstrokes, when a region of a face included in the input image accounts for a predetermined proportion or more of the input image.

(15)

The image processing device according to (13) or (14), wherein
the effect selection unit applies art effect of an oil painting style, as the art effect that expresses the brushstrokes, when a specific color is dominant in the input image.

(16)

The image processing device according to any one of (11) to (15), wherein
the effect selection unit does not apply the art effect to the input image, regardless of the intensity of the coherency, when a face included in the input image is smaller than a predetermined size.

(17)

The image processing device according to any one of (11) to (16), wherein
the effect selection unit applies one of art effect of an illustration style and art effect of a pointillism style, as the art effect, on the basis of a degree of a linear edge included in the input image, when applying the art effect to the input image.

(18)

The image processing device according to (8), wherein
the effect selection unit selects a type of zoom effect, on the basis of the coherency, when applying the zoom effect to the input image.

(19)

The image processing device according to (18), wherein
the effect selection unit selects one of walk-through and edge preservation zoom, as the zoom effect, on the basis of a tendency according to a region of the input image, of the coherency.

(20)

An image processing method including:
detecting, by a processing circuit of an image processing device, flow vectors of pixels in an input image; and
selecting, by the processing circuit of the image processing device, a process of effect to the input image, on the basis of a pattern of the flow vectors.

(21)

A program for causing a processing circuit of an image processing device to implement:
a function for detecting flow vectors of pixels in an input image; and
a function for selecting a process of effect to the input image, on the basis of a pattern of the flow vectors.

REFERENCE SIGNS LIST

10 system
100 imaging device
200 terminal device
300 server
503 image acquisition unit
505 effect setting unit
509 effect application unit
511 image output unit
517 record control unit
5051 image analysis unit
5053 flow vector detection unit
5055 flow coherency detection unit
5057 face detection unit
5059 effect selection unit
5061 zoom effect selection unit
5063 art effect selection unit

What is claimed is:

1. An image processing device comprising:
circuitry configured to
determine whether or not to apply a process of effect to an input image, based on a pattern of a flow vectors, wherein the flow vectors indicate a presence or absence of a vanishing point, and
select the process of effect that is applied to the input image based on an information of the input image.

2. The image processing device according to claim 1, wherein
the information of the input image includes whether the input image is captured in an outdoor location or an indoor location.

3. The image processing device according to claim 1, wherein
the circuitry is further configured to determine whether the input image is captured in an outdoor location or an indoor location based on whether a coherency of the flow vectors differs between an upper portion and a lower portion in the input image.

4. The image processing device according to claim 1, wherein
the circuitry is further configured to determine whether the input image is captured in an outdoor location or an indoor location based on whether an upper portion of the input image is brighter than a lower portion of the input image.

5. The image processing device according to claim 1, wherein
the information of the input image includes whether the input image includes an artificial object.

6. The image processing device according to claim 1, wherein
the circuitry is further configured to determine whether the input image includes an artificial object based upon whether the input image includes an intense linear edge.

7. The image processing device according to claim 6, wherein
the process of effect is a zoom effect, and an edge preservation zoom is applied as the zoom effect when it is determined that the input image includes the intense linear edge.

8. The image processing device according to claim 1, wherein
the image information of the input image includes whether the input image includes a face as a subject.

9. The image processing device according to claim 8, wherein
the process of effect is a zoom effect, and
an edge preservation zoom is applied as the zoom effect when it is determined that the input image includes the face as the subject.

10. The image processing device according to claim 1, wherein
the process of effect is a zoom effect, and
the circuitry is further configured to select at least one of a first zoom process or a second zoom process as the zoom effect.

11. The image processing device according to claim 10, wherein
the first zoom process comprises zooming to a particular point in the input image.

12. The image processing device according to claim 10, wherein
the second zoom process comprises rebuilding a space model with reference to a particular point in the input image.

13. The image processing device according to claim 10, wherein
the second zoom process comprises a walk-through zoom wherein a viewpoint is altered so that a reference point becomes a deepest portion of the input image.

14. A non-transitory computer readable medium storing program code for image processing, the program code being executable by a processor to perform operations comprising:
determining whether or not to apply a process of effect to an input image, based on a pattern of a flow vectors, wherein the flow vectors indicate a presence or absence of a vanishing point; and
selecting the process of effect that is applied to the input image based on an information of the input image.

15. The non-transitory computer readable medium according to claim 14, wherein
the information of the input image includes whether the input image is captured in an outdoor location or an indoor location.

16. The non-transitory computer readable medium according to claim 14, wherein the operations further comprise:
determining whether the input image is captured in an outdoor location or an indoor location based on whether a coherency of the flow vectors differs between an upper portion and a lower portion in the input image.

17. The non-transitory computer readable medium according to claim 14, wherein the operations further comprise:
determining whether the input image is captured in an outdoor location or an indoor location based on whether an upper portion of the input image is brighter than a lower portion of the input image.

18. The non-transitory computer readable medium according to claim 14, wherein
the information of the input image includes whether the input image includes an artificial object.

19. The non-transitory computer readable medium according to claim 14, wherein the operations further comprise:
determining whether the input image includes an artificial object based upon whether the input image includes an intense linear edge.

20. The non-transitory computer readable medium according to claim 19, wherein
the process of effect is a zoom effect, and
an edge preservation zoom is applied as the zoom effect when it is determined that the input image includes the intense linear edge.

21. The non-transitory computer readable medium according to claim 14, wherein
the image information of the input image includes whether the input image includes a face as a subject.

22. The non-transitory computer readable medium according to claim 21, wherein
the process of effect is a zoom effect, and
an edge preservation zoom is applied as the zoom effect when it is determined that the input image includes the face as the subject.

23. The non-transitory computer readable medium according to claim 14, wherein
the process of effect is a zoom effect, and
the operations further comprise selecting at least one of a first zoom process or a second zoom process as the zoom effect.

24. The non-transitory computer readable medium according to claim 23, wherein
the first zoom process comprises zooming to a particular point in the input image.

25. The non-transitory computer readable medium according to claim 23, wherein
the second zoom process comprises rebuilding a space model with reference to a particular point in the input image.

26. The non-transitory computer readable medium according to claim 23, wherein
the second zoom process comprises a walk-through zoom wherein a viewpoint is altered so that a reference point becomes a deepest portion of the input image.

27. An image processing method comprising:
determining whether or not to apply a process of effect to an input image, based on a pattern of a flow vectors, wherein the flow vectors indicate a presence or absence of a vanishing point; and
selecting the process of effect that is applied to the input image based on an information of the input image.

* * * * *